US008974131B2

(12) United States Patent
Kosuge

(10) Patent No.: US 8,974,131 B2
(45) Date of Patent: Mar. 10, 2015

(54) TAPE CATRIDGE AND TAPE PRINTER

(75) Inventor: Shinsaku Kosuge, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 24 days.

(21) Appl. No.: 13/805,313

(22) PCT Filed: Jun. 21, 2011

(86) PCT No.: PCT/JP2011/003541
§ 371 (c)(1), (2), (4) Date: Dec. 18, 2012

(87) PCT Pub. No.: WO2011/161955
PCT Pub. Date: Dec. 29, 2011

(65) Prior Publication Data

US 2013/0089366 A1 Apr. 11, 2013

(30) Foreign Application Priority Data

Jun. 25, 2010 (JP) ................................ 2010-145005

(51) Int. Cl.
*B41J 15/04* (2006.01)
*G11B 23/087* (2006.01)
*B41J 32/00* (2006.01)

(52) U.S. Cl.
CPC ......... *G11B 23/08707* (2013.01); *B41J 15/044* (2013.01); *B41J 32/00* (2013.01)
USPC .......................................................... 400/613

(58) Field of Classification Search
CPC ......................... G11B 23/08707; B41J 15/044
USPC .................. 242/559.4, 347; 400/208, 88, 613
See application file for complete search history.

(56) References Cited

U.S. PATENT DOCUMENTS

| | | | | |
|---|---|---|---|---|
| 5,333,959 | A | 8/1994 | Yamaguchi et al. | |
| 5,518,328 | A * | 5/1996 | Okuchi et al. | 400/208 |
| 5,595,447 | A | 1/1997 | Takayama et al. | |
| 5,788,387 | A | 8/1998 | Takayama et al. | |
| 6,126,344 | A | 10/2000 | Takayama et al. | |
| 6,386,774 | B1 | 5/2002 | Takayama et al. | |
| 2007/0031171 | A1* | 2/2007 | Heyse et al. | 400/615.2 |

FOREIGN PATENT DOCUMENTS

| | | | |
|---|---|---|---|
| EP | 0 635 375 | A2 | 1/1995 |
| EP | 0 958 931 | A2 | 11/1999 |
| EP | 1 329 327 | A1 | 7/2003 |
| JP | 05-185707 | A | 7/1993 |
| JP | 07-032709 | A | 2/1995 |
| JP | 10-071756 | A | 3/1998 |
| JP | 2000-103129 | A | 4/2000 |
| JP | 3882360 | B2 | 11/2006 |

* cited by examiner

*Primary Examiner* — Daniel J Colilla
(74) *Attorney, Agent, or Firm* — ALG Intellectual Property, LLC

(57) ABSTRACT

A tape cartridge 2 includes a tape core 21*b* rotatably supported in a cartridge case 25 and houses a print tape 21*a* wound around the tape core 21*b* such that the print tape 21*a* can be unwound. The tape core 21*b* includes a core body 26 with the print tape 21*a* wound around an outer peripheral surface of the core body 26, a disk-like rib 27 provided at a middle portion in an axial direction of an inner peripheral surface of the core body 26, and a shaft hole 28 formed at an axis center of the rib 27. The cartridge case 25 includes a shaft support 41 that is inserted into the shaft hole 28 and rotatably supports the tape core 21*b*, and a rotation guide 42 that slides on the inner peripheral surface of the core body 26.

13 Claims, 7 Drawing Sheets

TAPE CATRIDGE AND TAPE PRINTER

CROSS REFERENCES TO RELATED APPLICATIONS

The entire disclosure of Japanese Patent Application No. 2010-145005, filed on Jun. 25, 2010, is expressly incorporated by reference herein.

TECHNICAL FIELD

The present invention relates to a tape cartridge that includes a tape core rotatably supported in a cartridge case and that houses a tape wound around the tape core, and also relates to a tape printer.

BACKGROUND ART

There is known a tape cartridge including a core body with a tape wound around an outer peripheral surface of the core body; a tape core including a disk-like rib that is provided at a middle stage position of an inner peripheral surface of the core body and rotatably supported at a protrusion of a lower case; and a cartridge case that is divided into two upper and lower sections (see PTL 1).

Since the rib is provided at a middle portion in an axial direction of the inner peripheral surface of the core body, the protrusion may be inserted into the tape core of the tape cartridge in any direction. Hence, mount failure can be prevented during assembly.

CITATION LIST

Patent Literature

PTL 1: JP-A-10-071756

SUMMARY OF INVENTION

Technical Problem

However, the tape core is supported only by the rib with a predetermined dimensional tolerance with respect to the protrusion. Owing to this, a "rattle" or the like of the tape core may be generated as the result of rotation of the tape core, for example, when a tape is unwound. Hence, if a force for pulling the tape acts on the tape unevenly in a width direction of the tape, the tape core may be inclined, and the tape may be unwound while the tape is inclined.

An object of the invention is to provide a tape cartridge and a tape printer that can restrict inclination of a tape core and stabilize rotation of the tape core.

Solution to Problem

A tape cartridge according to an aspect of the invention includes a tape core rotatably supported in a cartridge case and houses a tape wound around the tape core such that the tape can be unwound. The tape core includes a core body with the tape wound around an outer peripheral surface of the core body, a disk-like rib provided at a middle portion in an axial direction of an inner peripheral surface of the core body, and a shaft hole formed at an axis center of the rib. The cartridge case includes a shaft support that is inserted into the shaft hole and rotatably supports the tape core, and a rotation guide that slides on the inner peripheral surface of the core body.

With this configuration, the rib slides on the shaft support and the rotation guide slides on the inner peripheral surface of the core body. The tape core is rotatably supported in the cartridge case at two positions of the shaft support and the rotation guide. Accordingly, the tape core rotates without a "rattle" (without being inclined), and the tape wound around the tape core can be unwound straight. Since the rib is provided at the middle portion in the axial direction and hence the tape core is not directional, the tape core to which the shaft support is inserted may be arranged in any direction during assembly.

In this case, the rotation guide may be preferably arranged on a normal line at a position at which the tape is unwound.

When the tape is unwound, the tape core is pulled in a direction in which the tape is unwound, and the tape core is inclined. That is, a force that causes inclination is generated at the position at which the tape is unwound.

However, with this configuration, since the rotation guide is provided at the position at which the force acts the most, the tape core can be prevented from being inclined, and stable rotation without the "rattle" can be assured.

In this case, at least the single rotation guide may be preferably provided in a circumferential direction of the shaft support.

Alternatively, in this case, the rotation guide may be preferably provided over an entire circumference of the shaft support.

With this configuration, the inclination of the tape core in any direction can be prevented, and the "rattle" of the tape core can be reliably prevented.

In this case, the rotation guide may be preferably arranged with the shaft support. Also, the shaft support and the rotation guide may preferably have a predetermined thickness and may be preferably integrally molded with the cartridge case.

With this configuration, the rotation guide can be formed with regard to molding of the rotation guide having sufficient structural stiffness. Accordingly, the rotation of the tape core can be stabilized.

A tape printer according to another aspect of the invention includes a cartridge mount on which the above-described tape cartridge is removably housed, and performs printing on the tape that is unwound from the tape cartridge. The cartridge mount includes a fit protrusion that is fitted to the rotation guide of the mounted tape cartridge.

With this configuration, when the fit protrusion is fitted to the rotation guide, the tape cartridge is fixed to the cartridge mount non-rotatably. Accordingly, the "rattle" of the tape cartridge at the cartridge mount can be eliminated. That is, the tape cartridge can be positioned and non-movably housed, and the rotation of the tape core in the tape cartridge can be stabilized.

DESCRIPTION OF EMBODIMENTS

First Embodiment

A tape printer according to a first embodiment of the invention will be described below with reference to the accompanying drawings. This tape printer performs printing while a print tape and an ink ribbon are unwound from a mounted tape cartridge and simultaneously run with a tension applied to the print tape and the ink ribbon, and the tape printer cuts a printed portion of the print tape to create a label (tape piece).

Figure 1:
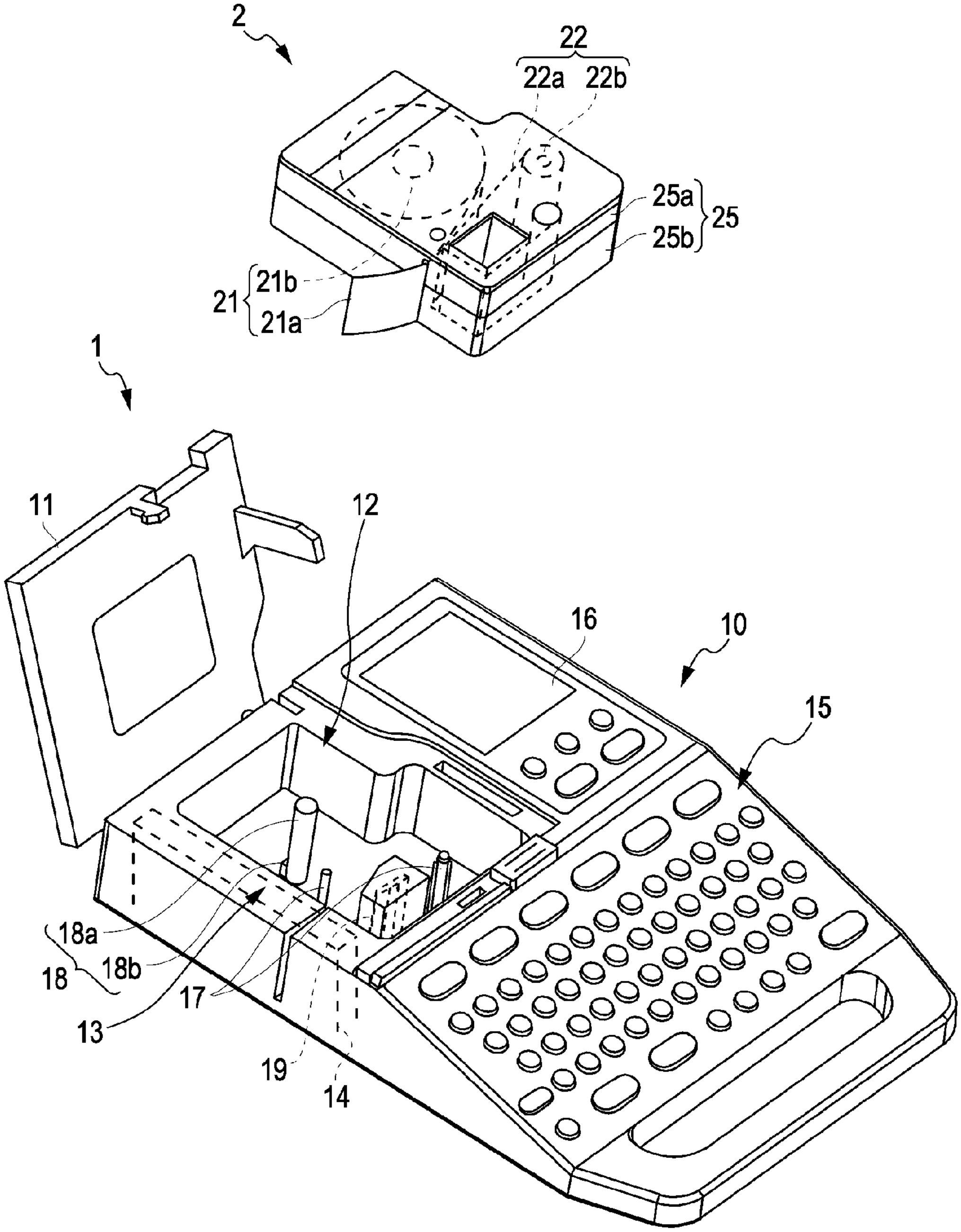
FIG. 1 is an external perspective view of a tape printer when a lid is open.
Figure 2:
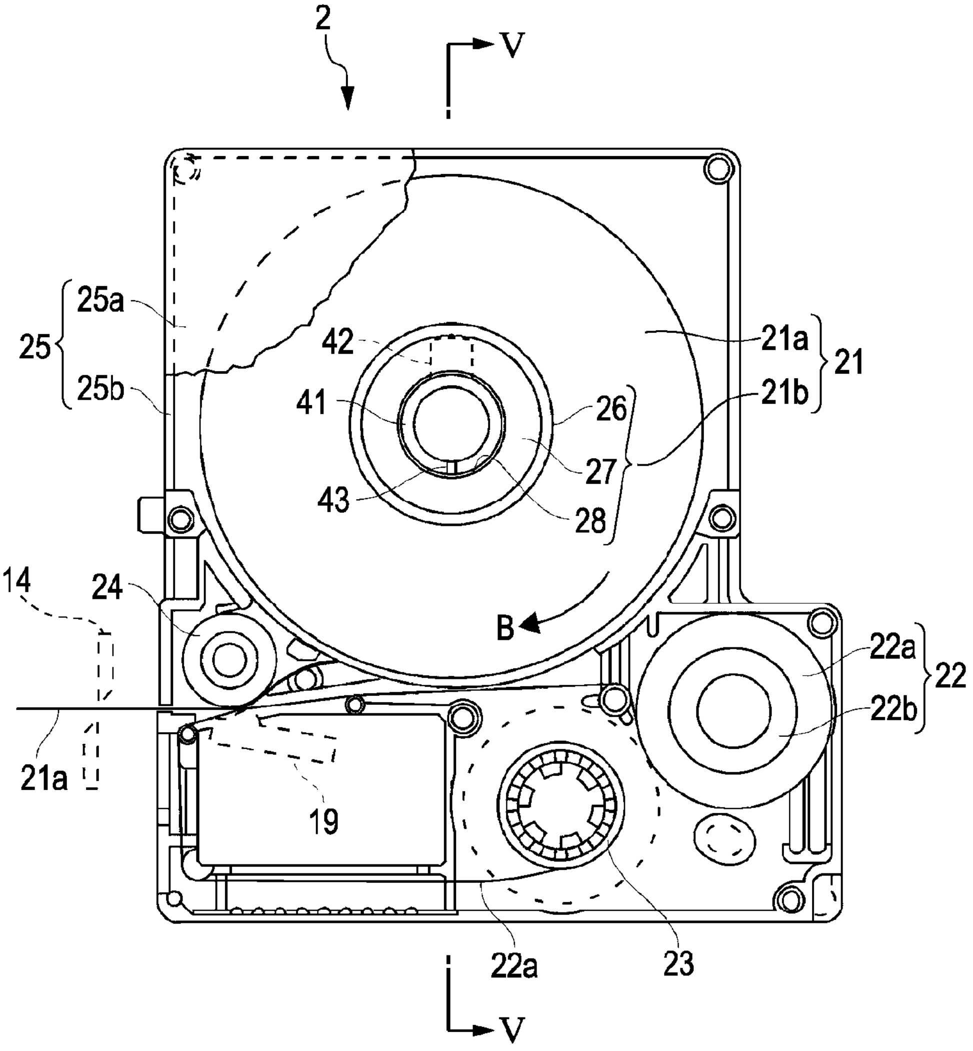
FIG. 2 is a plan view of a tape cartridge according to a first embodiment when an upper case is partly omitted.

A tape printer 1 etc. will be described with reference to FIGS. 1 and 2. FIG. 1 is an external perspective view of the tape printer 1 when a lid is open. FIG. 2 is a plan view of a tape cartridge 2 with an upper case 25*a* partly omitted. The tape printer 1 includes a device body 10 that defines an outer shell; a cartridge mount 12 that is depressed at the inside of an open/close lid 11, the tape cartridge 2 that houses a print tape 21*a* etc. being removably mounted on the cartridge mount 12; a tape feeder 13 that feeds the print tape 21*a* by unwinding the print tape 21*a* from the tape cartridge 2; and a cutter 14 that cuts the print tape 21*a* after printing. A user operates a keyboard 15 that is arranged on an upper surface of the device body 10, and executes a print operation while the user checks a display 16 that displays the operation result etc.

The tape cartridge 2 includes a tape unit 21 in which the print tape 21*a* is wound around a tape core 21*b*; a ribbon unit 22 in which an ink ribbon 22*a* is wound around a ribbon core 22*b*; a wind core 23 around which the used ink ribbon 22*a* is wound; and a platen roller 24 that unwinds and feeds the print tape 21 a from the tape unit 21.

The tape feeder 13 includes a plurality of driving shafts 17 that rotate the platen roller 24 and the wind core 23 to cause the print tape 21*a* and the ink ribbon 22*a* in the tape cartridge 2, which is mounted on the cartridge mount 12, to travel; a positioning protrusion 18 that engages with the tape core 21*b* and positions the tape core 21*b*; and a driving mechanism (not shown) that synchronously rotates the plurality of driving shafts 17.

When the tape cartridge 2 is mounted on the cartridge mount 12, a thermal head 19 contacts the platen roller 24 with the print tape 21*a* and the ink ribbon 22*a* arranged therebetween, and the tape printer 1 is brought into a print standby state (see FIG. 2). When printing is started, the ink ribbon 22*a* and the print tape 21*a* run in a superposed manner at a portion of the platen roller 24. The print tape 21*a* after print processing by the thermal head 19 is sent to the outside of the tape cartridge 2 and the device body 10. The cutter 14 cuts the printed portion in a tape-width direction, and hence a tape piece (label) is created. In contrast, the ink ribbon 22*a* is sent along a predetermined path in the tape cartridge 2, and is wound around the wind core 23.

Figure 3A:
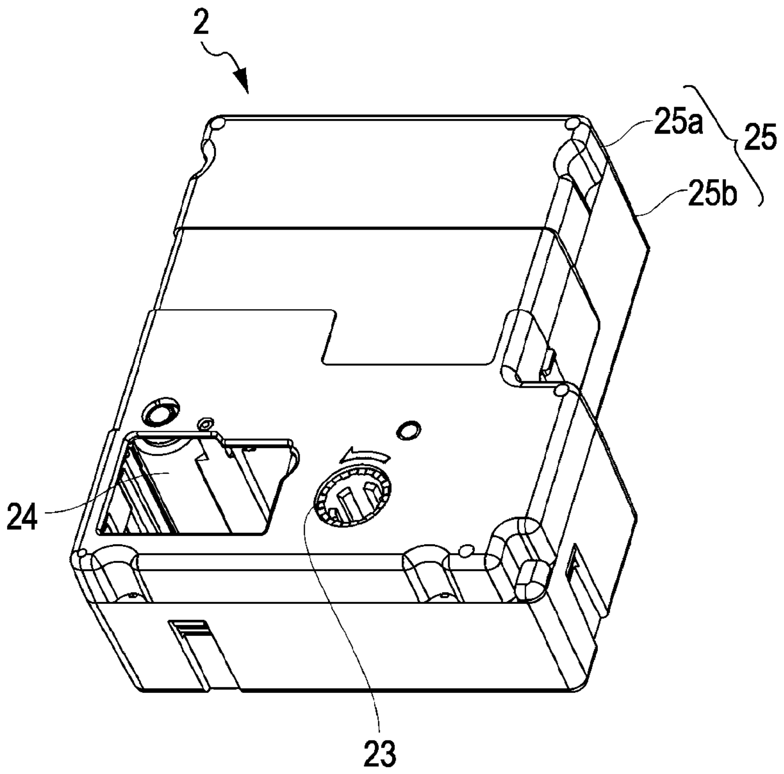
FIG. 3A is a front-side perspective view of the tape cartridge.
Figure 3B:
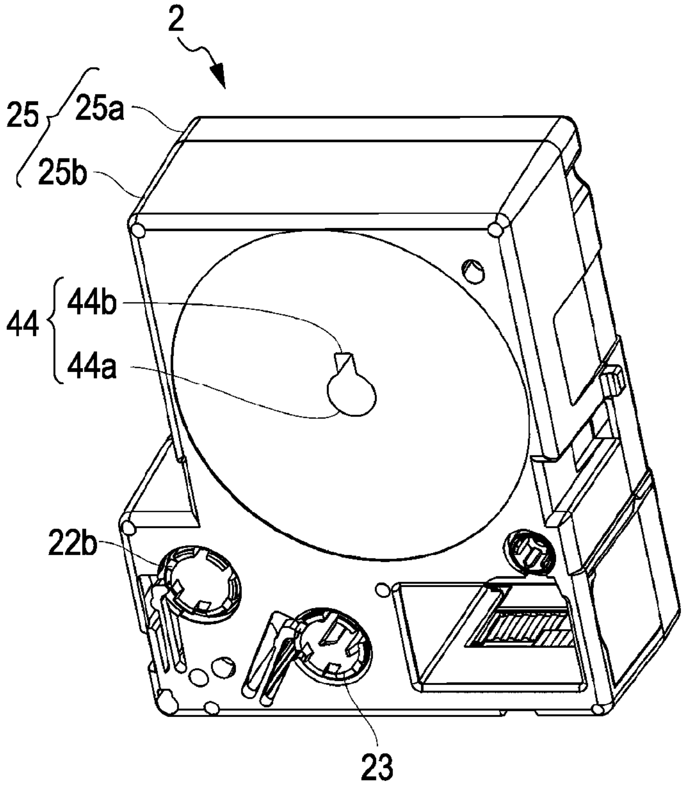
FIG. 3B is a back-side perspective view of the tape cartridge.
Figure 4:
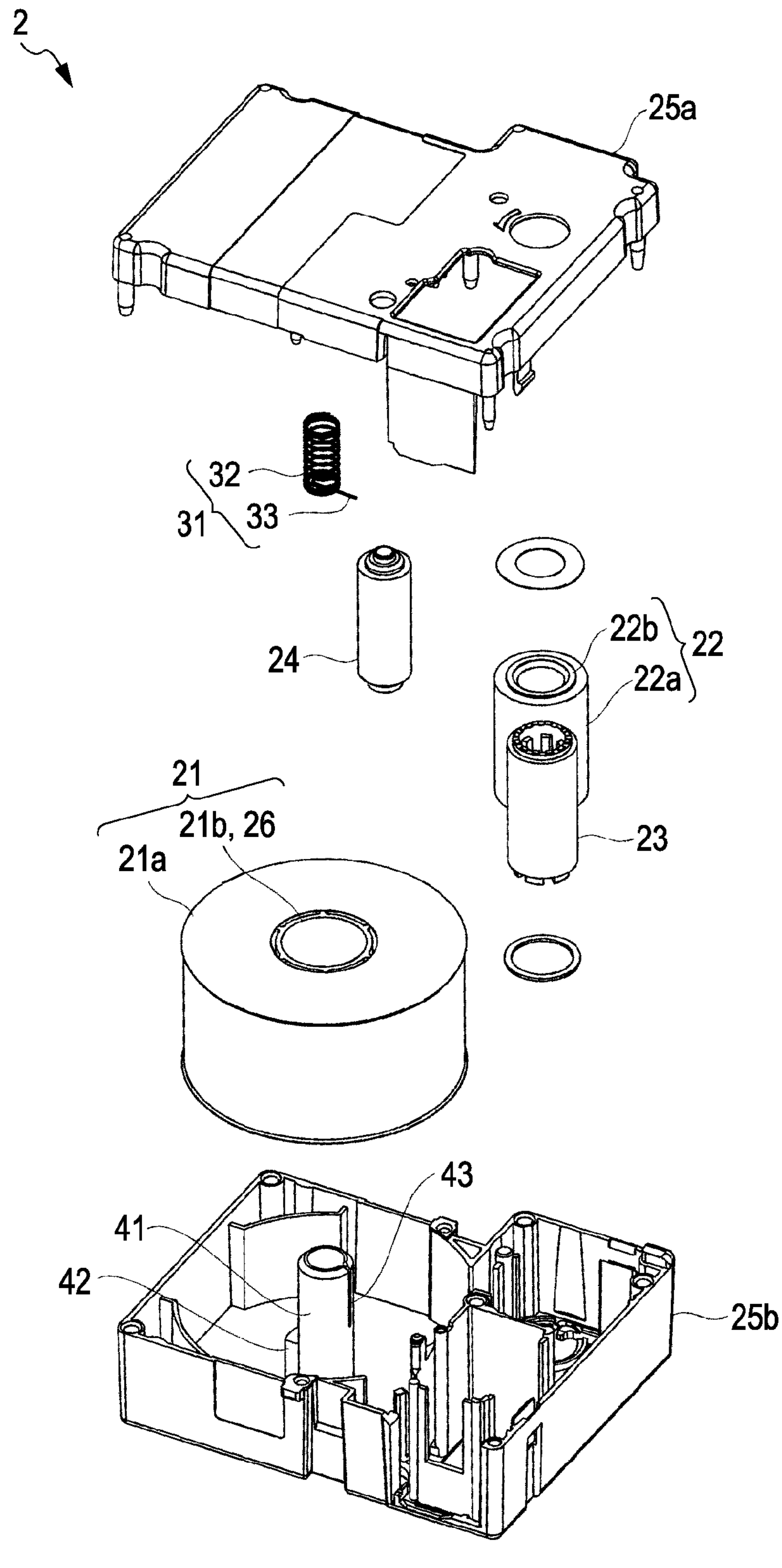
FIG. 4 is an exploded perspective view of the tape cartridge.
Figure 5A:
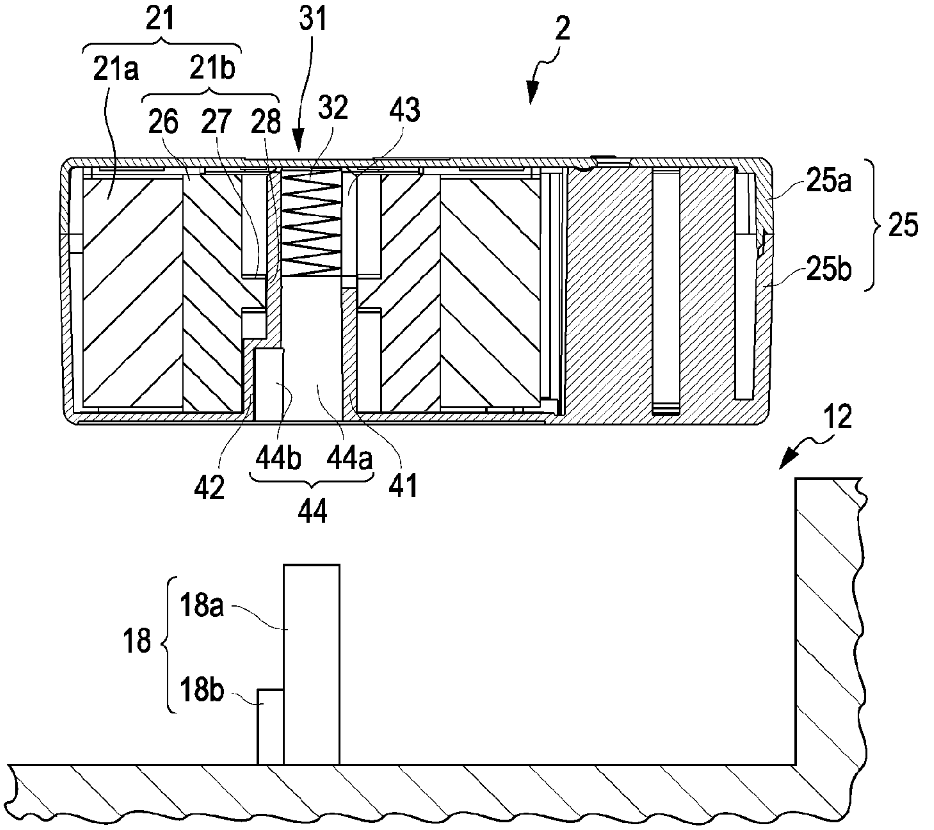
FIG. 5A is a cross-sectional view of the tape cartridge taken along line V-V in FIG. 2.
Figure 5B:
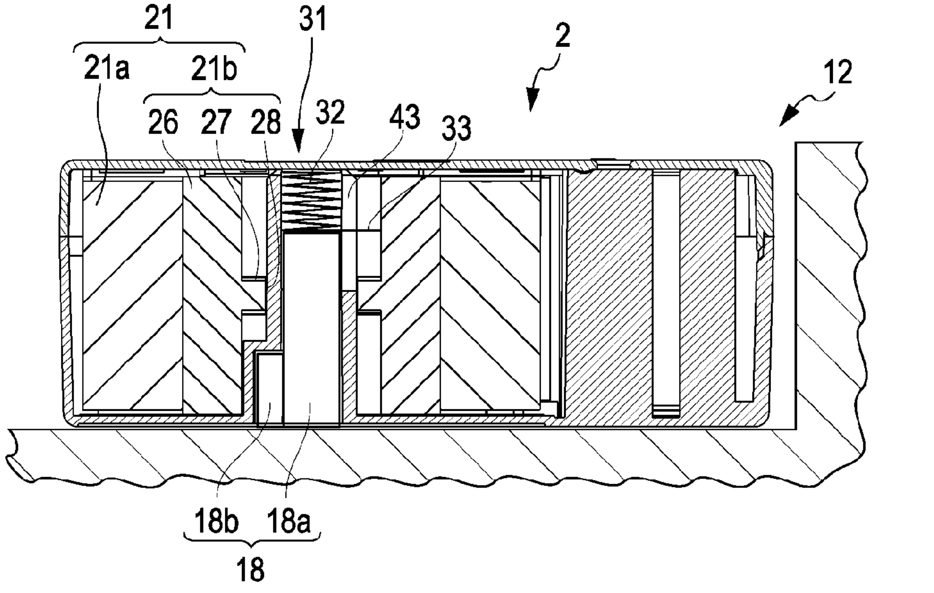
FIG. 5B is a cross-sectional view of a cartridge mount.

Next, the tape cartridge 2 will be described below in detail with reference to FIGS. 2 to 5B. FIGS. 3A and 3B are front-side and back-side perspective views of the tape cartridge 2. FIG. 4 is an exploded perspective view of the tape cartridge 2. FIGS. 5A and 5B are a cross-sectional view of the tape cartridge 2 taken along line V-V in FIG. 2 and a cross-sectional view of the cartridge mount 12. An outer shell of the tape cartridge 2 is formed by a cartridge case 25 including an upper case 25*a* and a lower case 25*b*. The cartridge case 25 houses therein the above-described tape unit 21, ribbon unit 22, wind core 23, and platen roller 24. The upper case 25*a* and the lower case 25*b* are press-fitted and joined by a pin and a through hole formed in joint end surfaces (so as to be disassembled and reused).

The tape core 21*b* of the tape unit 21 includes a core body 26 with a print tape 21*a* wound around an outer peripheral surface of the core body 26, a rib 27 that protrudes from a middle portion in an axial direction of an inner peripheral surface of the core body 26, and a shaft hole 28 that is formed at the axis center of the rib 27 (see FIGS. 2, 5A, and 5B). The core body 26, the rib 27, and the shaft hole 28 are integrally formed. The core body 26 has a hollow cylindrical shape. The rib 27 has a hollow disk-like shape with the shaft hole 28 formed at the axis center thereof.

Also, a backstop mechanism 31 is arranged at an inner peripheral surface of the core body 26 (see FIGS. 4, 5A, and 5B). The backstop mechanism 31 prevents an unwound end of the print tape 21*a* from being drawn into the cartridge case 25. The backstop mechanism 31 includes ratchet grooves (not shown) having sawtooth-like ratchet wheels that are formed at front and back surfaces of the rib 27 and allow only rotation in an unwinding direction of the print tape 21*a*, and a backstop spring 32 (i.e., coil spring) having both end portions that respectively contact the rib 27 and the upper case 25*a* and including a linear engagement portion 33 that linearly extends from a lower end portion of the backstop spring 32.

The lower case 25*b* includes a shaft support 41 that is inserted into the shaft hole 28 and rotatably supports the tape core 21*b*, and a rotation guide 42 that is arranged with the shaft support 41 so as to slide on the inner peripheral surface of the core body 26.

The shaft support 41 has a hollow cylindrical shape standing on the lower case 25*b*. A vertical groove 43 is formed from an upper end of the shaft support 41. The vertical groove 43 extends to a position lower than the position of the ratchet groove of the tape core 21*b* mounted at the shaft support 41 (see FIG. 5A).

Accordingly, when the backstop spring 32 is inserted into the inner periphery portion of the shaft support 41 while the linear engagement portion 33 is positioned with respect to the vertical groove 43, the linear engagement portion 33 is placed on the ratchet groove. Then, when the upper case 25*a* is mounted in this state, the backstop spring 32 is compressed, and the linear engagement portion 33 is pressed to the ratchet groove (see FIG. 5A). Hence, the tape core 21*b* is allowed to rotate in the unwinding direction of the print tape 21*a* (in a B direction in FIG. 2), and is inhibited from rotating in the reverse direction. When the tape cartridge 2 is mounted on the cartridge mount 12, the positioning protrusion 18 presses the backstop spring 32 from the lower side and disengages the linear engagement portion 33 from the ratchet groove (see FIG. 5B). That is, the linear engagement portion 33 is separated from the ratchet groove, and the tape core 21*b* becomes freely rotatable. Alternatively, the backstop spring 32 may have a structure that is mounted on an outer peripheral surface of the shaft support 41.

The rotation guide 42 protrudes from the shaft support 41 at a proximal end portion of the shaft support 41. The rotation guide 42 is integrally molded with the lower case 25*b* and has a predetermined thickness. In this embodiment, the rotation guide 42 is provided at a single position at the upper side in FIG. 2. The rotation guide 42 has a portion that slides on the inner peripheral surface of the core body 26 and that has a curvature radius substantially equivalent to the curvature radius of the inner peripheral surface. Hence, the rotation guide 42 does not disturb rotation of the tape core 21*b*. With such a configuration, when the tape core 21*b* is supported by the shaft hole 28 of the lower case 25*b*, the rib 27 of the core body 26 slides on the shaft support 41 and the rotation guide 42 slides on the inner peripheral surface of the core body 26. The tape core 21*b* is rotatably supported in the lower case 25*b* at two positions of the shaft support 41 and the rotation guide 42. Accordingly, the tape core 21*b* rotates without the "rattle" (without being inclined), and the phenomenon in which the print tape 21*a* wound around the tape core 21*b* is unwound while the print tape 21*a* is inclined can be prevented.

A fit opening 44 is formed in a lower surface (back surface) of the lower case 25*b* (see FIG. 3B). The fit opening 44 includes a hollow portion 44*a* that serves as an inner peripheral surface of the shaft support 41, and a recess portion 44*b* defined by the rotation guide 42. The hollow portion 44*a* and the recess portion 44*b* are integrally formed.

Next, the cartridge mount 12 on which the tape cartridge 2 is removably mounted will be described. As described above, the positioning protrusion 18 that engages with the tape core 21*b* and positions the tape core 21*b* stands on the cartridge mount 12 (see FIGS. 1, 5A, and 5B). The positioning protrusion 18 includes a fit shaft 18*a* and a fit protrusion 18*b*. The fit shaft 18*a* is fitted to the hollow portion 44*a* of the shaft support 41 and the fit protrusion 18*b* is fitted to the recess portion 44*b* by the rotation guide 42 when the tape cartridge 2 is mounted on the cartridge mount 12. In other words, when the tape cartridge 2 is mounted on the cartridge mount 12, the positioning protrusion 18 is fitted to the fit opening 44 at the lower surface of the lower case 25*b*, positions the tape cartridge 2 with respect to the cartridge mount 12, and fixes the tape cartridge 2 non-rotatably. Accordingly, the "rattle" of the tape cartridge 2 at the cartridge mount 12 can be eliminated, and the rotation of the tape core 21*b* provided in the tape cartridge 2 can be stabilized.

With the above configuration, the rib 27 and the rotation guide 42 can stabilize the rotation of the tape core 21*b*, and the print tape 21*a* wound around the tape core 21*b* can be properly unwound.

In this embodiment, the rotation guide 42 is arranged with the shaft support 41 and is integrally formed with the shaft support 41. However, the rotation guide 42 may be separately provided at a position apart from the shaft support 41.

Second Embodiment

Figure 6:
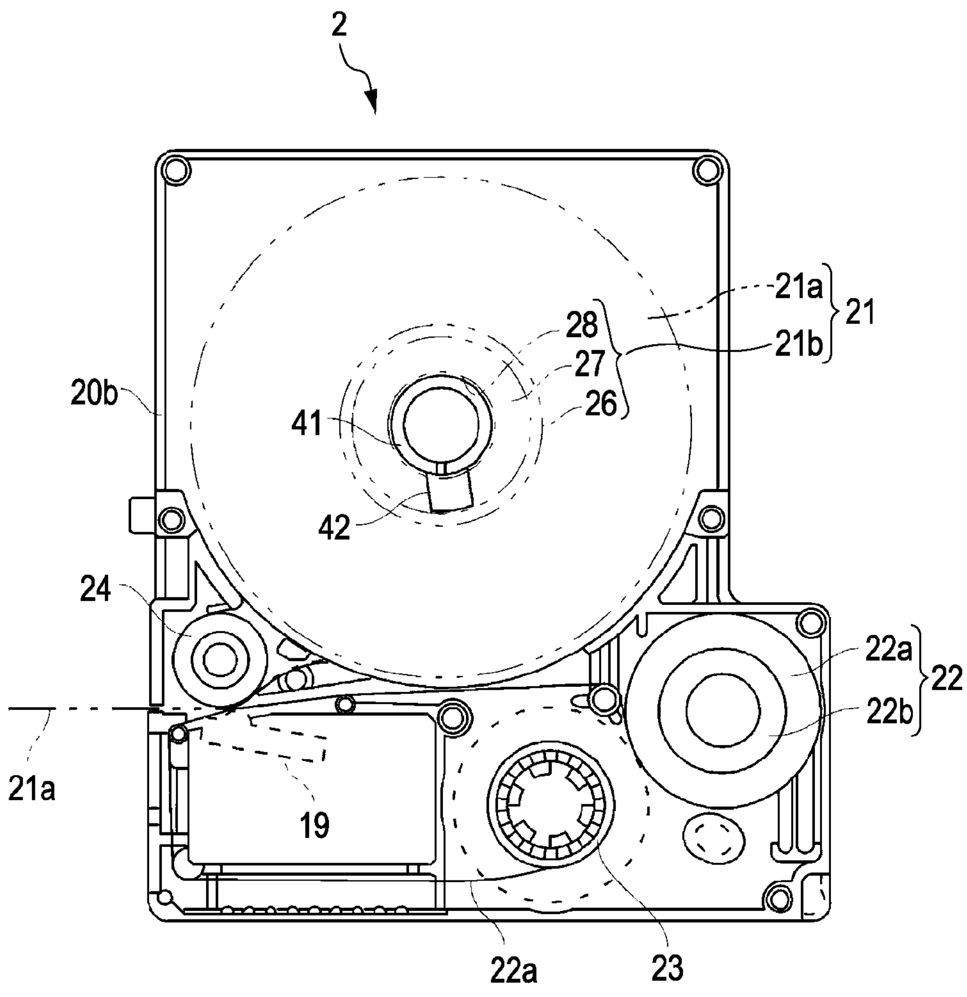
FIG. 6 is a plan view of a tape cartridge according to a second embodiment when an upper case is omitted.

A tape cartridge 2 according to a second embodiment will be described with reference to FIG. 6. Description similar to that in the first embodiment will be omitted. FIG. 6 is a plan view of the tape cartridge 2 according to the second embodiment when an upper case 25*a* is omitted. The tape cartridge 2 according to the second embodiment has a rotation guide 42 on a normal line at a position at which a print tape 21*a* is unwound. In this way, since the rotation guide 42 is provided at a portion on which a force that causes inclination acts the most (on which the largest force acts), the tape core 21*b* can be reliably prevented from being inclined, and rotation without the "rattle" can be assured.

Third Embodiment

Figure 7A:
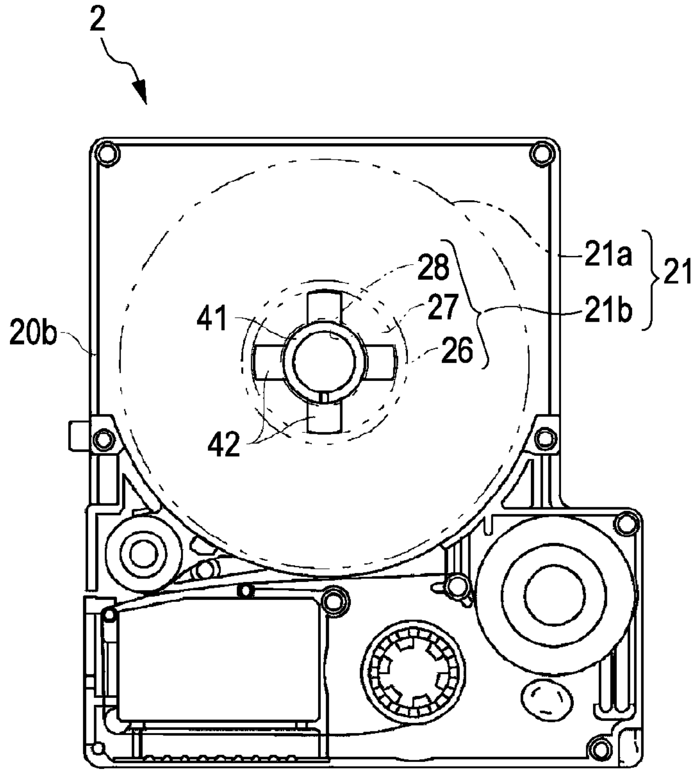
FIG. 7A is a plan view of a tape cartridge according to a third embodiment when an upper case is omitted.

FIG. 7A is a plan view of a tape cartridge 2 according to a third embodiment. Description similar to that in the first embodiment will be omitted. The tape cartridge 2 includes a plurality of (in this embodiment, four) rotation guides 42 that are evenly arranged in a circumferential direction of a shaft support 41. In this case, the number and positions of the rotation guides 42 are desirably determined. With this configuration, the inclination of the tape core 21*b* in a plurality of directions can be prevented, and the "rattle" of the tape core 21*b* can be reliably prevented.

Modification of Third Embodiment

Figure 7B:
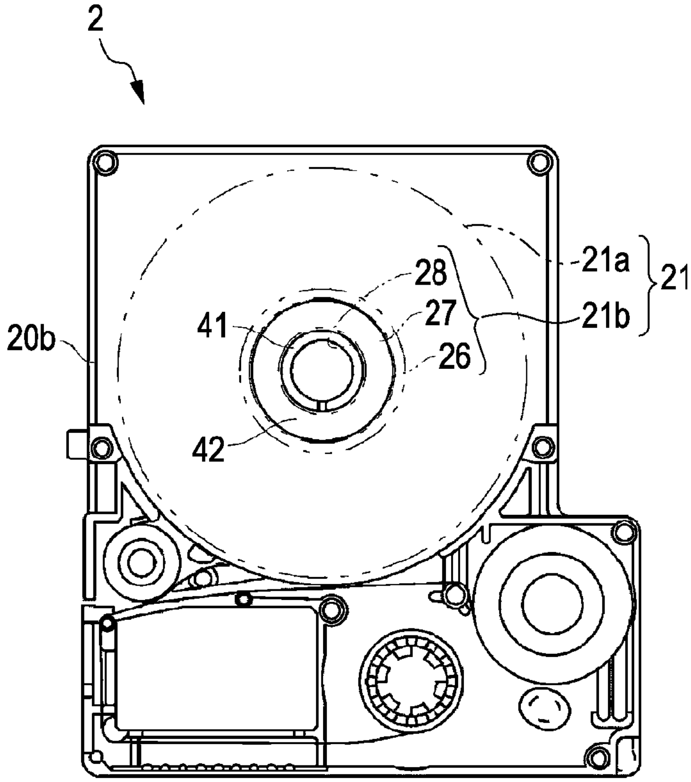
FIG. 7B is a plan view of a tape cartridge according to a modification of the third embodiment when an upper case is omitted.

FIG. 7B is a plan view of a tape cartridge 2 according to a modification of the third embodiment. The tape cartridge 2 includes a rotation guide 42 that extends over the entire circumference of a shaft support 41. With this configuration, the inclination of the tape core 21*b* can be further reliably prevented, and the "rattle" of the tape core 21*b* can be reliably prevented.

REFERENCE SIGNS LIST

1 tape printer
2 tape cartridge
18*b* fit protrusion
21*a* print tape
21*b* tape core
25 cartridge case
26 core body
27 rib
28 shaft hole
41 shaft support
42 rotation guide

The invention claimed is:

1. A tape cartridge comprising:
a cartridge case;
a tape core including
a core body configured to hold a tape wound around an outer peripheral surface of the core body,
a rib having a disk shape and protruding from an inner peripheral surface of the core body, and
a shaft hole defined within the rib;
a shaft support protruding from the cartridge case and extending through the shaft hole and configured to rotatably support the tape core; and
a rotation guide protruding from the cartridge case between the shaft support and the inner peripheral surface of the core body,
wherein a gap is defined between the rotation guide and the rib in a direction substantially parallel to an axial direction of the tape core.

2. The tape cartridge of claim 1, wherein an outer peripheral surface portion of the rotation guide slides along the inner peripheral surface of the core body when the core body rotates.

3. The tape cartridge of claim 1, wherein the outer peripheral surface portion of the rotation guide has a curvature radius substantially equivalent to a curvature radius of the inner peripheral surface of the core body.

4. The tape cartridge of claim 3, wherein the outer peripheral surface portion of the rotation guide has an arc length that is less than a circumference of the inner peripheral surface of the core body.

5. The tape cartridge of claim 4, wherein the rotation guide is disposed on a line normal to a direction of a force for unwinding the tape from the tape core.

6. The tape cartridge of claim 1, wherein the rotation guide protrudes radially from the shaft support.

7. The tape cartridge of claim 6, wherein the rotation guide is provided over less than an entire circumference of the shaft support.

8. The tape cartridge of claim 7, wherein the rotation guide and the shaft support are integrally formed.

9. The tape cartridge of claim 1, wherein
the rotation guide and the shaft support are hollow, and
the cartridge case defines a fit opening including
a hollow portion defined by an inner surface of the shaft support, and a recess portion defined by an inner surface of the rotation guide.

10. The tape cartridge of claim 9, wherein the fit opening has a non-circular shape in a surface of the cartridge case in which the fit opening is defined.

11. The tape cartridge of claim 9, wherein, when the tape cartridge is mounted in a cartridge mount of a tape printer, the cartridge mount having a fit shaft and a fit protrusion that extend from the cartridge mount, the hollow portion is configured to receive the fit shaft, and the recess portion is configured to receive the fit protrusion.

12. The tape cartridge of claim 11, wherein, when the tape cartridge is mounted in the cartridge mount, the recess portion is fitted to the fit protrusion such that the tape cartridge is non-rotatably fixed in the cartridge mount.

13. The tape cartridge of claim 1, further comprising a plurality of rotation guides disposed between the shaft support and the inner peripheral surface of the tape core.

* * * * *